United States Patent
Light et al.

(10) Patent No.: US 7,326,911 B2
(45) Date of Patent: *Feb. 5, 2008

(54) DETECTING AND THWARTING CONTENT SIGNALS ORIGINATING FROM THEATRICAL PERFORMANCES

(75) Inventors: Elliott D. Light, Rockville, MD (US); Jon L. Roberts, Great Falls, VA (US)

(73) Assignee: Auctnyc 19 LLC, Wilmington, DE (US)

( * ) Notice: Subject to any disclaimer, the term of this patent is extended or adjusted under 35 U.S.C. 154(b) by 104 days.

This patent is subject to a terminal disclaimer.

(21) Appl. No.: 11/245,841

(22) Filed: Oct. 7, 2005

(65) Prior Publication Data

US 2006/0033017 A1     Feb. 16, 2006

Related U.S. Application Data (63) Continuation-in-part of application No. 11/180,143, filed on Jul. 13, 2005, now abandoned, which is a continuation-in-part of application No. 11/122,425, filed on May 5, 2005, now Pat. No. 7,020,383, which is a continuation-in-part of application No. 10/816,970, filed on Apr. 2, 2004, now Pat. No. 6,977,366, which is a continuation-in-part of application No. 10/294,273, filed on Nov. 14, 2002, now Pat. No. 6,861,640.

(51) Int. Cl.
*G03B 19/18* (2006.01)

(52) U.S. Cl. .......... 250/221; 352/39; 386/94; 340/539.1

(58) Field of Classification Search .......... 352/38, 352/39, 201; 386/94; 340/539.1; 342/450
See application file for complete search history.

(56) References Cited

U.S. PATENT DOCUMENTS 5,959,717 A     9/1999   Chaum (Continued)

FOREIGN PATENT DOCUMENTS

CA          2 563 159 A1     11/2005

(Continued)

OTHER PUBLICATIONS

Gary Brown, How Autofocus Cameras Work:, Internet Article, http://travel.howstuffworks.com/autofocus.htm.

(Continued)

*Primary Examiner*—Georgia Epps
*Assistant Examiner*—Stephen Yam
(74) *Attorney, Agent, or Firm*—Sterne, Kessler, Goldstein & Fox P.L.L.C.

(57) ABSTRACT

A system and method of detecting and thwarting the use of unauthorized imaging systems at theatrical performances. Sensors are deployed at a theatrical event to detect a focusing signal and/or the RF signal of an unauthorized imaging device. De-focusing signals are used to disrupt the auto focus system of imaging devices that do not use IR focusing systems. A thwarting signal comprising invisible light frequencies may be combined to produce a thwarting signal that is received by the CCD of an imaging device as white light thereby rendering the recorded image unusable. Emission signatures of imaging devices are stored in a datastore and distributed to users of thwarting systems via a network. Emission signatures are associated with thwarting signals to allow detection and thwarting systems to respond quickly to the use of an unauthorized imaging device.

23 Claims, 5 Drawing Sheets

U.S. PATENT DOCUMENTS

| | | | |
|---|---|---|---|
| 6,018,374 | A | 1/2000 | Wrobleski |
| 6,529,600 | B1 | 3/2003 | Epstein et al. |
| 6,674,561 | B2 | 1/2004 | Ohnishi et al. |
| 6,742,901 | B2 | 6/2004 | Kimura et al. |
| 6,771,349 | B2 | 8/2004 | Sitrick et al. |
| 6,809,792 | B1 | 10/2004 | Tehranchi et al. |
| 6,856,935 | B1 | 2/2005 | Fehlis et al. |
| 6,861,640 | B2 | 3/2005 | Light et al. |
| 6,868,229 | B2 | 3/2005 | Balogh |
| 6,950,532 | B1 | 9/2005 | Schumann et al. |
| 6,977,366 | B2 | 12/2005 | Light et al. |
| 7,006,630 | B2 * | 2/2006 | Yu et al. ............... 380/201 |
| 7,020,383 | B2 | 3/2006 | Light et al. |
| 2003/0219231 | A1 * | 11/2003 | Vernon ............... 386/94 |
| 2004/0091110 | A1 | 5/2004 | Barkans |
| 2004/0252835 | A1 | 12/2004 | Odgers |
| 2005/0242273 | A1 | 11/2005 | Light et al. |

FOREIGN PATENT DOCUMENTS

| | | |
|---|---|---|
| EP | 1 057 323 | 2/2002 |
| WO | WO 99/43150 A1 | 8/1999 |
| WO | WO 00/74366 | 12/2000 |
| WO | WO 2005/106918 A1 | 11/2005 |

OTHER PUBLICATIONS

Smarthome.com: Universal Keychain Remote Product Description, Internet product order form, http://www.smarthome.com/8001.html.

PoGo! Products: "About PoGo! Products, Inc.," Internet product listing/ general information, http:www.pogoproducts.com/about.html; http:www.pogoproducts.com/remote_controls.html.

* cited by examiner

DETECTING AND THWARTING CONTENT SIGNALS ORIGINATING FROM THEATRICAL PERFORMANCES

RELATIONSHIP TO OTHER APPLICATIONS

This application is a continuation in part of U.S. application Ser. No. 11/180,143 filed Jul. 13, 2005 now abandoned, which is a continuation in part of U.S. application Ser. No. 11/122,425, filed May 5, 2005 now U.S. Pat. No. 7,020,383, which is a continuation in part of U.S. application Ser. No. 10/816,970, filed Apr. 2, 2004 now U.S. Pat. No. 6,977,366, which is a continuation in part of U.S. application Ser. No. 10/294,273, filed Nov. 14, 2002, now U.S. Pat. No. 6,861,640, all of which are hereby incorporated by reference for all purposes and from which priority is claimed.

BACKGROUND

The present invention relates generally to the field of entertainment. More specifically, the present invention is a system and method of detecting and thwarting the use of unauthorized imaging systems at theatrical performances.

Entertainment is a multibillion-dollar business. Movies, plays, and concerts represent investments that have both a time value and an intellectual property value. The time value of an entertainment asset is usually very high, but reflects the reality that over time the demand for an entertainment asset will decline as access to the asset increases or as competition from other entertainment assets increases. For example, a movie is most valuable when it is first released to theaters and the potential audience is exposed to advertising and hype about the movie. The movie declines in value over time as the audience has viewed the movie and as other movies are released.

Entertainment assets also have an intellectual property value. A movie, for example, that has completed its theater run has potential value as a video for sale or rental purposes. The movie is a copyrighted asset and that asset can be sold or licensed. Similarly, a live performance has its own copyright that is highly valuable and requires protection.

Increasingly, entertainment assets are subject to piracy. Theaters and other venues that admit patrons to movies, concerts, and plays forbid the motion picture filming, video recording or still photograph recording of performances. However, it is difficult to police such conditions of admission. Finding a video camera or other imaging system in a large, dark theater is a significant challenge. Additionally, imaging systems may be concealed and the video content and audio content of the theatrical performance transmitted to a location that is external to the venue where the performance is taking place. It is also the case that within days or even hours of the release of a new movie, pirated copies of varying quality are available for sale on the street. Such copies are frequently the result of an unscrupulous individual taking a video camera into the theater and simply filming or recording the movie. Copies can then be rapidly made in a "boiler room" environment and sold on the street. And this does not only apply to movies. Live concerts and performances are equally protected by the copyright laws and, unfortunately, are equally as vulnerable to this form of pirating. Additionally, a still camera can image a performer in concert even when such taking of pictures is prohibited. What is needed is a means of detecting, locating and/or thwarting the use of an imaging system that is being used to surreptitiously record a theatrical performance.

SUMMARY

An embodiment of the present invention is a system and method of detecting, locating and/or thwarting the use of an imaging system that is being used to surreptitiously film a theatrical event. For purposes of this application, the phrase "imaging system" is used to describe (a) any still or movie camera whether digital or tape based having a storage medium capable of recording and reconstructing a theatrical performance, and (b) a video and audio transducers cable of capturing the audio and video content of the performance and transmitting that content to location external to the theatrical event. The term "thwarting" is used to describe any action that either detects that video and audio capture is occurring, stops the recording or renders the recording useless, or any combination thereof.

It is an aspect of the present invention to detect and locate an imaging system that is being used to surreptitiously film a theatrical event.

It is another aspect of the present invention to detect the infrared auto focus beam emitted by an imaging system being used to surreptitiously film a theatrical event.

It is yet another aspect of the present invention to detect the radio frequency signature of an imaging system being used to surreptitiously film a theatrical event.

It is still another aspect of the present invention to detect both still and video imaging systems.

It is an aspect of the present invention to thwart the recording of a theatrical event by an imaging system by interfering with the recording process or rendering the recording useless for viewing.

It is another aspect of the present invention to "blast" an image recording system when any focus beam is detected.

It is another aspect of the present invention to periodically blast the viewing area to thwart recording even when a focus beam is not detected.

It is still another aspect of the present invention to halt a theatrical experience upon detection of a focus beam.

It is a further aspect of the present invention to precisely record the focus beam in use, and characterize that beam to produce a more effective thwarting signal and for later forensic analysis.

It is an aspect of the present invention to detect and thwart the capture of the video and audio content of a theatrical performance and transmission of that content to a location external to the venue of the theatrical performance.

It is another aspect of the present invention to locate an imaging device used to "pirate" a theatrical performance.

These and other aspects of the present invention will become apparent from a review of the detailed description that follows.

In general terms, the system and method of the present invention detects the auto focus function of an imaging system and provides signals that thwart the recording of any video and audio content by that system. Further, the present invention does not require that an auto focus system be detected. For example, and without limitation, a thwarting signal may be continuously sent out over an audience at a theatrical event to adversely affect the functioning of an imaging system.

An embodiment of the present invention provides a system for detecting the pirating of a theatrical experience. A sensor is arranged spatially proximate to the area wherein the theatrical experience is taking place and connected to a network. The sensor is adapted to sense an auto focus emission from an imaging system and to send a signal in the event an auto focus emission is received. Alternative embodiments allow for the distribution of multiple sensors to detect the auto focus emission(s). In still another alternate embodiment, the plurality of sensors is further adapted to receive radio frequency emissions from an imaging system. In another embodiment of the present invention, the sensor(s) adapted to receive radio frequency emissions is located in audience seating fixtures. Hence, when the application refers to the term "sensor" it will be understood by those skilled in the art that this is not meant as a limitation. Multiple sensors may also be used to effect the detection of surreptitious recording as noted herein. Additionally sensors that are independent of the detection sensors may be used to receive, characterize, and thwart video and audio content transmissions intended for reception outside the venue in which the theatrical performance is taking place.

A processor connected to the network and adapted to receive the signal from the sensor(s) initiates a "remedial action" if a signal indicative of an imaging device is received at a sensor. For purposes of this application, the term "remedial action" means an alert provided to managers of the performance or venue that an unauthorized recording is taking place. Alternatively, the "remedial action" is a flag or trigger created upon sensing of the unauthorized recording that in turns triggers an automated response in the form of the thwarting signal that disrupts the recording.

In one embodiment of the present invention the processor comprises a computer program for determining the location of the imaging system from which the emission emanates. In an embodiment of the present invention, the area wherein the theatrical experience is taking place is a room and the sensor is located on the interior walls defining the room. In another embodiment of the present invention, the area wherein the theatrical experience is taking place is an outdoor theater and the sensor is mounted on structures arranged spatially so as to surround a space occupied by an audience.

In an embodiment of the present invention, a method of detecting the pirating of a theatrical experience is provided. A sensor is located proximate to the area in which the theatrical experience is taking place. The sensor receives auto focus emissions from an imaging system. A processor receives the output of the sensor. If auto focus emissions from an imaging system are detected, an alarm is initiated that alerts appropriate authorities and/or which serves to initiate an automated response by the system of the present invention in the form of a thwarting signal. Optionally, the sensor receives radio frequency emissions of an imaging system. Additionally, the processor may further comprise software means for determining the location of the source of auto focus emissions received by the sensor. Through the use of well known triangulation techniques, a physical location of an imaging system from which an auto focus emission is occurring can be determined.

In another embodiment of the present invention, the sensor(s) adapted to receive radio frequency emissions is located in or in association with, audience seating fixtures. The seating fixture sensors comprising an identification system that is associated with a location in the venue of the theatrical performance. By way of illustrating and not as a limitation, the sensor comprises a transceiver comprising a receiver and a transmitter. The receiver is tuned to receive the radio frequency emissions emitted by the imaging device. The transmitter is responsive to reception of a signal by the receiver and sends reporting signal comprising the sensor location identifier. The sensors are uniquely identified as to their respective positions within the theater so that a signal from a given sensor can be associated with a physical location within the theater. In an alternate embodiment, the reporting signal further comprises a detected signal strength of the emissions received by the receiver. A location system uses the reporting signals and the detected signal strengths sent by senor-transceivers proximate to the imaging device to locate the imaging device within the theatrical venue.

In yet another embodiment of the present invention, a method of thwarting the pirating of a theatrical experience is provided. A thwarting signal generator is located proximate to the area in which the theatrical experience is taking place. The thwarting signal generator may, for example, be near the stage aimed into the audience, or be located on the walls of a room or at a various other points whereby the signal will cover the audience area from which the auto focus signal is emanating. The thwarting signal that is emitted is preferably visible to the imaging system but not visible to the human eye. Unauthorized imaging systems may be, without limitation, a still camera, a moving picture camera, a CCD array camera, and a cellular telephone camera. In one embodiment of the present invention, the thwarting signal is in the infrared region of the spectrum.

In another embodiment of the present invention, the thwarting signal is a short duration visible light signal not visible to the human eye. In still another alternative embodiment, the thwarting signal may be in the RF region of the electromagnetic spectrum. Alternatively, the thwarting signal is emitted from a thwarting signal generator attached to on-stage equipment. In another embodiment of the present invention, the thwarting signal is emitted from a thwarting signal generator attached to the periphery of a stage. In yet another embodiment of the present invention, the thwarting signal is emitted from a thwarting signal generator positioned behind a screen. It will be apparent to those skilled in the art that other locations for the thwarting signal generator(s) are a matter of design choice based upon the configuration of the audience to be covered and the signal strength needed or dictated by laws and regulations.

In one embodiment of the present invention, the thwarting signal generator may be configured to emit known infrared and/or RF commands designed to stop, or interfere with, an illicit recording. Most recording devices provide an infrared interface for controlling the recording device. Thus, for example, along with projecting a pattern to recording devices, the projectors could also emit all known stop, rewind, eject, etc. commands for recording devices, and do so repetitively many times per second. Thus, to an unsophisticated thief, the recording device would appear to malfunction. A given thwarting signal generator may have multiple emitters to inure good coverage of any venue. Further, single thwarting signal generator of the present invention may simultaneously interfere with many image recording devices of differing brands to degrade the image being recorded while also emitting differing control commands to interfere with the normal operation of a multitude of different types of image recording devices.

In yet another embodiment of the present invention, the thwarting signal generator is adapted to interfere with a transmission of audio and/or video content from the theatrical venue.

In another embodiment of the present invention, a method of thwarting the pirating of a theatrical experience is provided. A plurality of thwarting signal generators are located proximate to the area in which the theatrical experience is taking place. A thwarting signal that is detectable by the unauthorized imaging system but that is not visible to the human eye is emitted.

DETAILED DESCRIPTION

In one embodiment of the present invention, infrared (IR) sensors are installed on the performance area (i.e., a stage or screen) where the theatrical event is being performed and on structures to the sides and back of the performance area, and on structures above the audience. The IR sensors are sensitive to IR energy emitted by range finders (auto focus devices) used in imaging system equipment. This IR light is generally emitted by an imaging system as a main beam at a target. The target reflects the light back to the imaging system where it is received and processed to determine the distance of the target from the imaging system.

The IR light transmitters on an imaging system not only emit a main beam of IR light, but also emit less powerful side lobes that can be detected by IR sensors of the present invention located on either side of the imaging system. Alternatively, IR sensors can be placed on stage, at the back of a stage, on equipment or scenery that is on stage in order to capture the fact that the main IR beam is being used to focus on performers at a performance. In the case of a movie screen, a "pinhole" aperture in the screen may also be used with a detector behind the screen to again capture the fact that an IR beam (or other energy) is being used to focus on the screen. Such a pinhole aperture would be unseen by the audience but allow energy to be sensed.

Further, the present invention provides IR sensors located behind the imaging system for detecting the IR radiation reflected from the target. These sensors are placed in fixed locations on the back wall of the theater, for example, or in the case of so-called "stadium" seating, on the front walls of the various tiers of the theater. Sensors in the ceiling may also be used to pick up IR scattered by the target.

Not all IR emitters emit in precisely the same way. Thus part of the present invention is to not only detect that a focusing signal is present, but to record and characterize that signal. Thus for forensic purposes, one could then later reconstruct the type of imaging system used, and potentially, even the brand of IR emitter used and even the precise emitter. Since copyright violations are criminal in nature, this information can be used for later prosecution efforts. Additionally, this analysis of the IR signal can be used in real time to send a thwarting signal tuned or adapted to the emitter that is detected so that a more effective thwarting signal can be created.

According to an embodiment of the present invention, emissions from imagining devices are stored in a datastore of imagining device "emission signatures" that may be used for detection, thwarting, and forensic study. Emission signatures may be "pre-characterized" or collected at sites of theatrical events. According to an embodiment of the present invention, the emission signatures are associated with a thwarting signal and made available to users of the thwarting systems describe herein via a network.

Some video cameras do not use IR for auto focus but rely on the incoming light for optimization of imaging being recorded. In these imaging systems, a CCD image sensor and an associated processor will sense incoming wave forms of light reflected from, for example, a screen in movie theater and will create an image as sharp as possible. Because the sharpest image possible requires the highest possible frequency, the system tries to find the highest frequency in the incoming image and adjust the position of the CCD to optimize reception of this frequency. In another embodiment of the present invention, a de-focusing signal is used to disrupt this type of auto focus system.

In this embodiment, the de-focusing signal is a high frequency light pulse that is emitted from a source that is in front of or behind the performance area, thereby causing the imaging system to misfocus the recorded image or to cause the imaging system to constantly change in focus point. In another embodiment, a plurality of de-focusing signals is used at various focal points to disrupt the recording process. Again, the sources for such energy can be at the periphery of a venue, on equipment that is on-stage or directly behind the performers or other locations where the energy can be aimed at an audience for image disruption purposes.

A passive auto focus system uses contrast to determine when focus of an image has been achieved. The microprocessor in an imagining devices looks at a strip of pixels and looks at the difference in intensity among the adjacent pixels. If the image is out of focus, adjacent pixels have very similar intensities. The microprocessor moves the lens, looks at the CCD's pixels again and sees if the difference in intensity between adjacent pixels improved or got worse. The microprocessor then searches for the point where there is maximum intensity difference between adjacent pixels—that is the point of best focus.

In an embodiment of the present invention, a thwarting signal comprises a brief pulse of light that causes the contrast of an image to change, thereby affecting the ability of the auto focusing system to determine a proper focus of the scene. In an embodiment of the present invention, the pulse rate is faster than the human eye can respond, thereby making the pulse "invisible" to humans even if the light frequency is within the visible spectrum.

In still another embodiment of the present invention, a "thwarting signal" comprises a light source emitting energy in the light spectrum that is not visible to the human eye but which is detectable by the CCD of a digital imaging system. By way of example and not as a limitation, many CCDs used in video cameras are sensitive to IR energy. A thwarting signal comprising IR energy would be seen in a recording as a white light. Other invisible light frequencies may be combined to produce a thwarting signal of this kind. As new CCDs are developed, the thwarting signal may thus be adjusted to accommodate the spectral sensitivity of the CCD to achieve the thwarting objectives previously described. In another embodiment, the thwarting signal is projected onto a screen from a movie projector. In another embodiment, the thwarting signal is projected outward from the performance area of a live performance.

In addition, with new generations of imaging cellular telephone, the potential for a "non-focusing" system is even more present. The thwarting signals of the present invention operate to disrupt the imaging capabilities of such devices.

Because the human eye cannot detect short duration pulses of light, a thwarting signal may comprise light energy in the visible spectrum. In this embodiment, light is pulsed at high energy, but not sufficiently high to be detected by the human eye. In another embodiment, a thwarting signal comprises both light from the visible and invisible spectrum and is pulsed to thwart a recording of a theatrical event. In an embodiment of the present invention, the frequency, power, and pulse rate of a visible light thwarting signal are selected to briefly saturate a CCD array an imaging system and continue to saturate the CCD array before it fully recovers.

Figure 1:
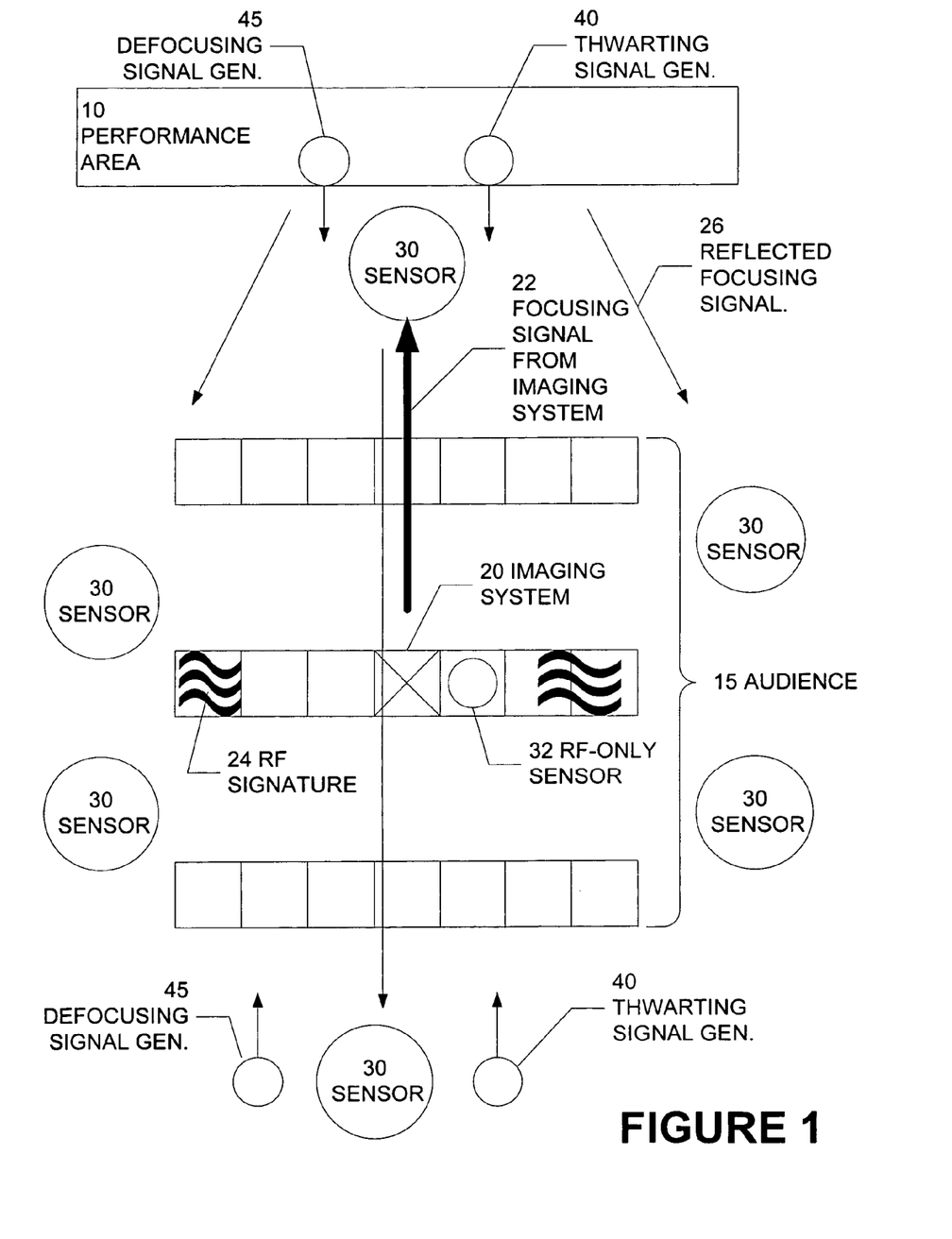
FIG. 1 illustrates a block diagram of a thwarting system configured for use during a theatrical performance according to an embodiment of the present invention.

FIG. 1 illustrates a block diagram of a thwarting system configured for use during a theatrical performance according to an embodiment of the present invention. Referring to FIG. 1, a theatrical performance is performed on performance area 10 and viewed by audience 15. A member of the audience is filming the theatrical performance using an imaging system 20. The imaging system 20 emits both a focusing signal 22 and an RF signature 24. In an embodiment of the present invention, the focusing signal is an IR light signal. However, the present invention is not so limited. Other focusing signals may be utilized without departing from the scope of the present invention. The focusing signal is reflected 26 from the focal object. Additionally, side lobes of the focusing signal produced by the auto focus system of the imaging system are radiated perpendicular to the direction of the lens. Sensors 30 are placed at the performance area (out of view of the audience), to the sides of the audience, and at the back of the audience to receive both the focusing signal and the RF signature of the imaging system. An RF-only sensor 32 is deployed in a seat of the audience.

In one embodiment of the present invention, each seat is equipped with an RF-only sensor 32. The RF-only sensor 32 comprises an identification system that is associated with a location in the venue of the theatrical performance. By way of illustrating and not as a limitation, the sensor comprises a transceiver comprising a receiver and a transmitter. The receiver is tuned to receive the radio frequency emissions emitted by the imaging device. The transmitter is responsive to reception of a signal by the receiver and sends reporting signal comprising the sensor location identifier. In an alternate embodiment, the reporting signal further comprises a detected signal strength of the emissions received by the receiver. A location system uses the reporting signals and the detected signal strengths sent by senor-transceivers proximate to the imaging device to locate the imaging device within the theatrical venue.

Thwarting signal generators 40 and defocusing signal generators 45 are also illustrated forward and behind imagining system 20. However, the present invention is not so limited. Thwarting signal generators 40 and defocusing signal generators 45 may be place to the side of and overhead of the imaging system 20.

In an embodiment of the present invention, the IR sensors are connected to a processor through a network. When the processor receives data from the IR sensors the data may be used to mathematically triangulate the approximate location of the imaging system using means known in the art.

In another embodiment of the present invention, RF detectors are used in lieu of or in addition to IR sensors. In this embodiment, the RF detectors scan the audience for an RF signature that matches a fingerprint of a digital camera. Detected RF signals are provided to a processor. When the processor receives data from the RF sensors the data may be used to mathematically triangulate the approximate location of the imaging system using means known in the art. In another embodiment of the present invention, the RF detectors are used in conjunction with the IR sensors and allow the IR sensors to be focused on a suspected operating camera. Additionally, RF detectors may be installed in the audience seating fixtures.

In still another embodiment, thwarting signal generators 40 and defocusing signal generators 45 are deployed without detectors.

The system of the present invention is moveable. For example, it is envisioned that a touring theatrical event can uninstall the system at one event and transport it to the next event and install it there. Thus the producers of that theatrical event can have some assurances that protection will be afforded to the performance wherever it goes.

Figure 2:
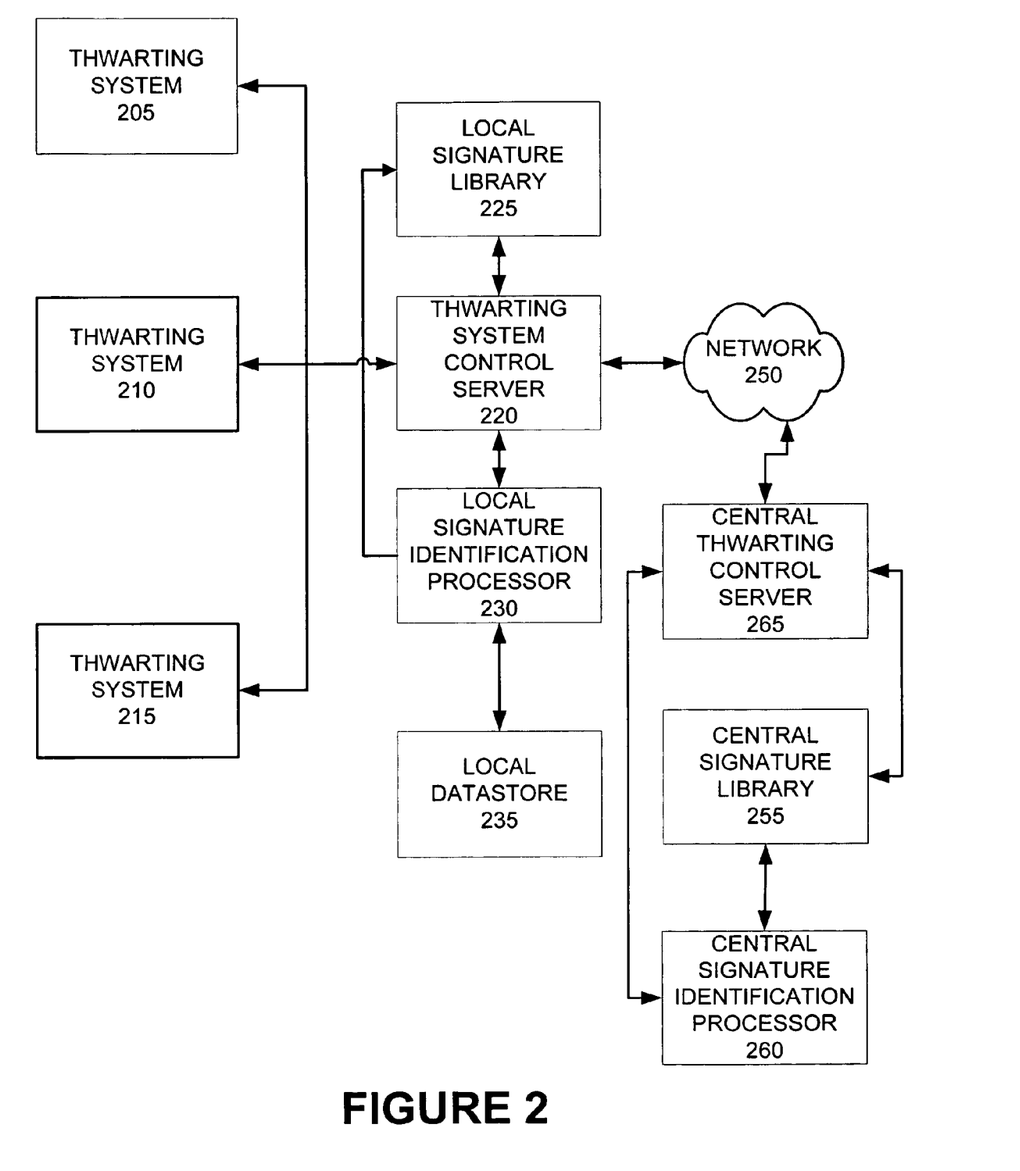
FIG. 2 illustrates an emission signature storage and distribution system according to an embodiment of the present invention.

FIG. 2 illustrates an emission signature storage and distribution system according to an embodiment of the present invention. In an embodiment of the present invention, thwarting systems 205, 210, and 215 are controlled by thwarting system control server 220. By way of illustration and not as a limitation, thwarting systems 205, 210, and 215 and thwarting system control server 220 may be installed in a movie theater complex to protect theatrical performances presented in multiple theaters. Thwarting control server 220 accesses local signature library 225 to determine whether an "emission" signature detected by a thwarting system is indicative of an imaging device and to associate the emission signature with at least one thwarting signal. By way of illustration and not as a limitation, emission signatures comprise IR emissions, electromagnetic emissions, and RF emissions.

If an emission signature is not in local signature library 225, thwarting control server 220 may refer the unknown emission signature to local signature identification processor 230 for analysis. Detected emission signatures are stored in local datastore 235 and may be used for thwarting and forensic study at a later time. An emission signature that is associated with an imaging device and with a thwarting signal by local signature identification processor 230 is added to local signature library 225.

Emission signatures may be "pre-characterized" using a central signature identification processor 260 or collected at sites of theatrical events where thwarting systems 205, 210, and 215 are in use. The emission signatures are associated with an imaging device and a thwarting signal and made accessible to users of thwarting systems 205, 210, and 215 via a network 250. Access to central signature library 255 is provided through central control server 265. According to an embodiment of the present invention, central control server 265 provides secured access to the emission signature data held in central signature library 255 and to central signature identification processor 260. In another embodiment of the present invention, central control server 265 manages automatic updates to the emission signature data held in local signature library 225 used by thwarting systems 205, 210, and 215 via a network 250.

In one embodiment of the present invention, the thwarting signal generator may be configured to emit known infrared commands designed to stop, or interfere with, an illicit recording. Most recording devices provide an infrared interface for controlling the recording device. Thus, for example, along with projecting a pattern to recording devices, the projectors could also emit all known stop, rewind, eject, etc. commands for recording devices. Thus, to an unsophisticated thief, the recording device would appear to malfunction. Assuming multiple emitters within a thwarting signal generator, a single thwarting signal generator may simultaneously interfere with image recording while also emitting control commands. The control commands for a particular imaging device may be stored in the local signature library 225 and/or the central signature library 255 and associated with an emission signature. In one embodiment of the present invention, the control commands for all known imaging devices may be broadcast continuously when the presence of an imaging device is detected thus interfering with the normal operation of those imaging devices.

Figure 3:
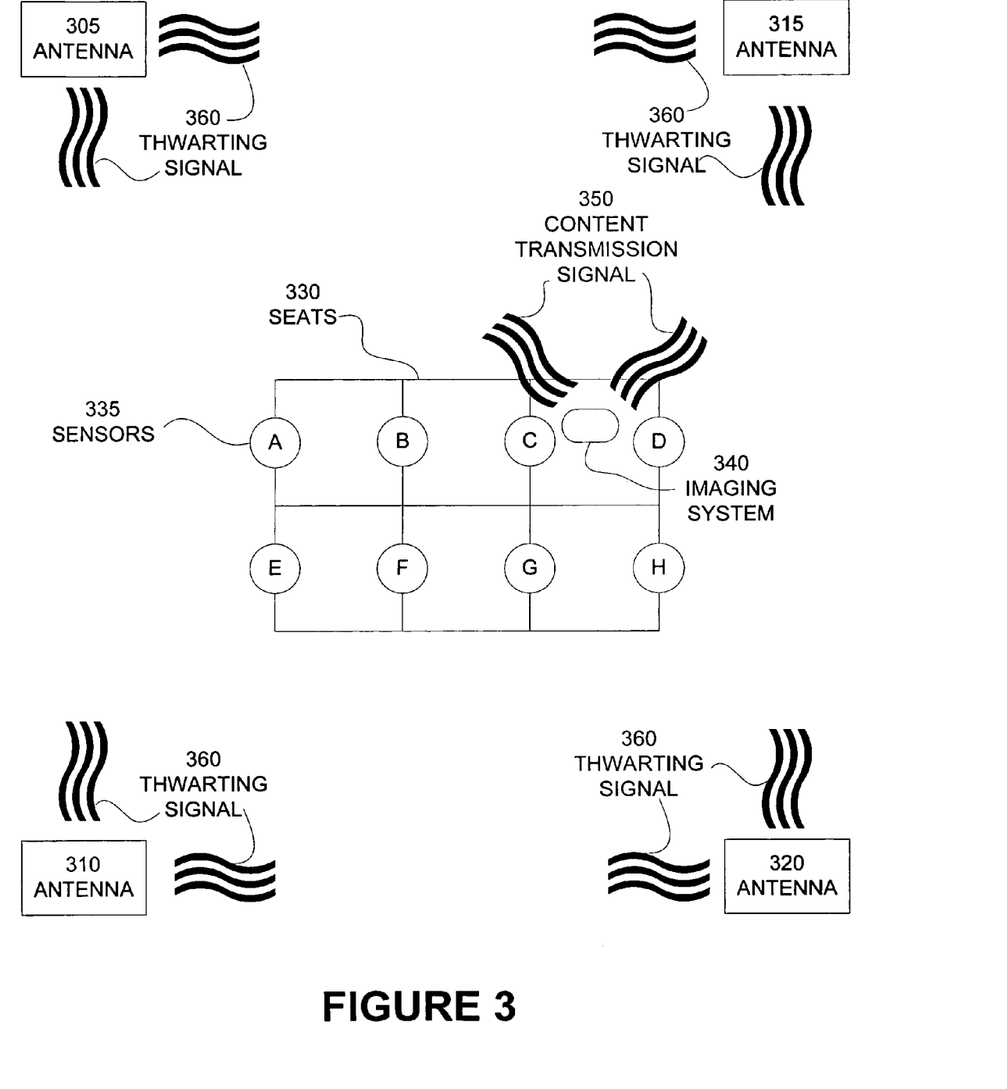
FIG. 3 illustrates a block diagram of a thwarting system for thwarting video and audio content transmission from a theatrical performance venue according to an embodiment of the present invention.

FIG. 3 illustrates a block diagram of a thwarting system for thwarting video and audio content transmission from a theatrical performance venue according to an embodiment of the present invention.

A theatrical performance venue comprises antennas 305, 315, 320 and 325. FIG. 3 further illustrates a section of the audience seating 330 in which each seat is associated with a sensor 335. An imaging device 340 is located between sensors 335 C and D. Imaging device 340 emits content transmission signal 350.

As previously described, imaging system 340 emits an RF fingerprint that comprising the RF "noise" generated by the various circuits of the imaging system. The RF fingerprint is detected by sensors 335. As will be appreciated by those skilled in the art, the signal strength of the RF fingerprint of imaging system 340 will be strongest in proximity to sensors 335 C and D.

Figure 4:
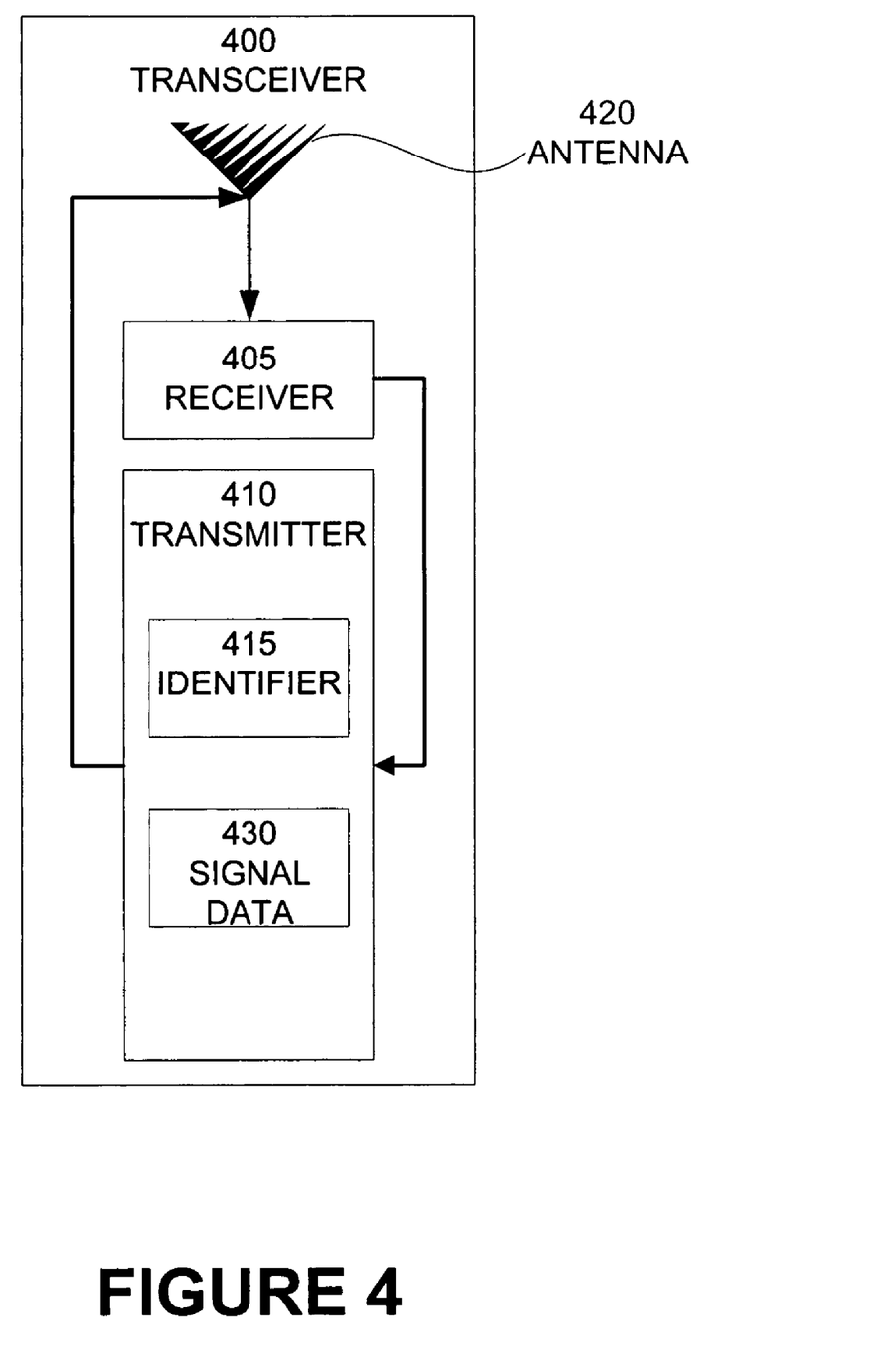
FIG. 4 illustrates a transceiver associated with an RF sensor in accordance with an embodiment of the present invention.

FIG. 4 illustrates a transceiver associated with an RF sensor in accordance with an embodiment of the present invention. A sensor (see FIG. 3, 335) comprises an identification system that is associated with a location in the venue of the theatrical performance. By way of illustrating and not as a limitation, the sensor comprises a transceiver 400 comprising an antenna 420, a receiver 405 and a transmitter 410. The receiver 405 is tuned to receive the radio frequency emissions emitted by the imaging device. The transmitter 410 is responsive to reception of a signal by the receiver and sends a reporting signal comprising the sensor location identifier 425. In an alternate embodiment, the reporting signal further comprises signal data 430 relating to the RF emissions emitted by the imaging device. By way of illustration and not as a limitation, the signal data may comprise signal strength measures of the emissions received by the receiver. A location system (not illustrated) uses the reporting signals and the detected signal strengths sent by senor-transceivers proximate to the imaging device to locate the imaging device within the theatrical venue.

Figure 5:
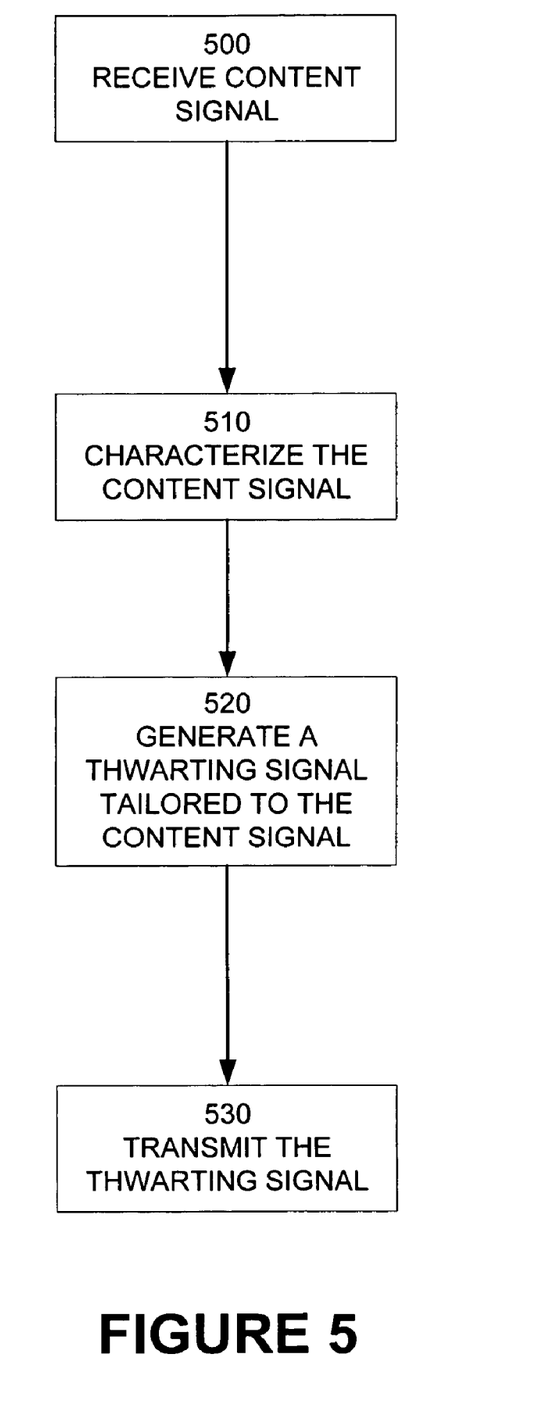
FIG. 5 illustrates a process for thwarting the transmission video and audio content from a theatrical performance venue according to an embodiment of the present invention.

FIG. 5 illustrates a process for thwarting the transmission video and audio content from a theatrical performance venue according to an embodiment of the present invention. Referring also to FIG. 3, in response to detection of an RF fingerprint of an imaging device, antennas 305, 315, 320, and 325 receive transmission signals 500 over a broad spectrum. The transmission signals are characterized 510 and a determination is made that the signals are content transmission signals. As will be appreciated by those skilled in the art this process may be accomplished in a number of ways. By way of illustration and not as a limitation, an "empty" venue baseline RF scan is taken of the performance venue. During a performance in which an imaging device is detected, antennas 305, 315, 320, and 325 may be used to scan the performance venue to identify "foreign signals" that may be characterized as content transmission signals.

A thwarting signal is generated to block or interfere with a particular foreign signal 520. The thwarting signal is then broadcast 530 via antennas 305, 315, 320, and 325.

By way of illustration and not as a limitation, a content transmission signal may be compliant with handshake-based transmission protocols (e.g., Bluetooth™ and 802.11(x)) or may be one-way transmission signal modulated as FM, AM or spread spectrum.

A system and method of detecting and thwarting the use of unauthorized imaging systems at theatrical performances has now been illustrated. It will be understood by those skilled in the art of the present invention that the systems and methods of the present invention can be used with or without detecting a focusing signal. Thus the invention will be useful in providing periodic "blasts" of energy to thwart the recording of a theatrical event even when detection of a focusing signal has not occurred. Whether or not a focusing signal has been detected, a variety of thwarting signals in the visible, near-IR and RF frequencies may be used to disrupt the imaging on an event. Further, although the claims herein discuss a single sensor or thwarting signal generator, this is not meant as a limitation. The present invention anticipates that multiple sensors and thwarting signal generators are to be used in preferred embodiments, the number and strength of which will vary depending on the size and shape of the venue in which the theatrical experience is taking place. Additionally, the systems and methods may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A thwarting system for preventing pirating of a theatrical experience comprising:
   a network;
   a processor connected to the network;
   a content thwarting signal generator;
   a sensor installed within a theatrical performance venue and connected to the network, wherein the sensor is adapted for:
      detecting RF noise emissions within the theatrical performance venue; and
      sending RF noise emission data to the processor; and
   wherein the processor is adapted for:
      receiving the RF noise emission data from the sensor;
      determining if the RF noise emission data is indicative of a presence of an imaging device;
      determining whether a content signal has been transmitted by the imaging device if the RF noise emission data are indicative of the presence of the imaging device; and
      commanding the content thwarting signal generator to transmit a content thwarting signal to thwart the content signal if the content signal has been transmitted by the imaging device.

2. The system of claim 1, wherein the system further comprises a content signal datastore and the processor is further adapted for:
   characterizing the content signal as a content signal signature;
   associating the content signal signature with the content thwarting signal; and
   storing the content signal signature and the associated content thwarting signal in the content signal datastore.

3. The system of claim 1, wherein the content signal is a spread spectrum signal, a Bluetooth signal, an 802.11(x) signal, an amplitude modulated signal, or an FM modulated signal.

4. The system of claim 1, wherein the content thwarting signal comprises a noise signal.

5. The system of claim 1, wherein the area wherein the theatrical performance venue is a room and the sensor is located on the interior walls defining the room.

6. The system of claim 1, wherein the theatrical performance venue is an outdoor theater and the sensor is mounted on structures arranged spatially so as to sense an area occupied by an audience.

7. The system of claim 1, wherein the processor comprises a location system configured for determining the location of the imaging device from which the emission emanates.

8. The system of claim 1, wherein the sensor is located in audience seating fixtures.

9. The system of claim 1, wherein the sensor comprises a sensor location identifier that is associated with a location within the theatrical performance venue.

10. The system of claim 1, wherein the system further comprises a location system, wherein the sensor comprises a transceiver, and wherein the transceiver comprises:
   an antenna;
   a local receiver; and
   a local transmitter and wherein:
      the local receiver is adapted for receiving the RF noise emissions from the imaging device;
      the transmitter is adapted for sending an RF noise emission data to the location system in response to reception of RF noise emissions by the receiver; and
   wherein the location system locates the imaging device based on the RF noise emission data.

11. The system of claim 1, wherein the sensor comprises a sensor location identifier that is associated with a location within the theatrical performance venue and the RF noise emission data comprises a sensor location identifier.

12. The system of claim 11, wherein the RF noise emission data further comprises a signal strength measure of the RF noise emissions received by the sensor.

13. A method of preventing pirating of a theatrical experience comprising:
   receiving at a sensor RF noise emissions from a theatrical performance venue;
   receiving at a processor RF noise emission data from the sensor;
   determining at the processor whether the RF noise emission data are indicative of a presence of an imaging device;
   determining whether a content signal has been transmitted by the imaging device if the emission data are indicative of the presence of the imaging device; and
   commanding a content thwarting signal generator to transmit a content thwarting signal to thwart the content signal if the content signal has been transmitted by the imaging device.

14. The method of preventing the pirating of a theatrical experience of claim 13 further comprising:
   characterizing the content signal as a content signal signature;
   associating the content signal signature with the content thwarting signal; and
   storing the content signal signature and the associated content thwarting signal in a content signal datastore.

15. The method of preventing the pirating of a theatrical experience of claim 13, wherein the content signal is a spread spectrum signal, a Bluetooth signal, an 802.11(x) signal, an amplitude modulated signal, or an FM modulated signal.

16. The method of preventing the pirating of a theatrical experience of claim 13, wherein the content thwarting signal comprises a noise signal.

17. The method of preventing the pirating of a theatrical experience of claim 13, wherein the theatrical performance venue is a room and the sensor is located on the interior walls defining the room.

18. The method of preventing the pirating of a theatrical experience of claim 13, wherein the theatrical performance venue is an outdoor theatre and the sensor is mounted on the structures arranged spatially so as to sense an area occupied by an audience.

19. The method of preventing the pirating of a theatrical experience of claim 13, wherein the sensor is located in audience seating fixtures.

20. The method of preventing the pirating of a theatrical experience of claim 13, wherein the RF noise emission data comprise a sensor location identifier that associates the sensor with a location within the theatrical performance venue.

21. The method of preventing the pirating of a theatrical experience of claim 20 further comprising using the RF noise emission data to locate the imaging device within the theatrical performance venue.

22. The method of preventing the pirating of a theatrical experience of claim 13, wherein the RF noise emission data comprise a signal strength measure of the RF noise emissions received by the sensor.

23. The method of preventing the pirating of a theatrical experience of claim 22 further comprising using the RF noise emission data to locate the imaging device within the theatrical performance venue.

* * * * *

UNITED STATES PATENT AND TRADEMARK OFFICE
CERTIFICATE OF CORRECTION

| | | |
|---|---|---|
| PATENT NO. | : 7,326,911 B2 | Page 1 of 1 |
| APPLICATION NO. | : 11/245841 | |
| DATED | : February 5, 2008 | |
| INVENTOR(S) | : Elliott D. Light | |

It is certified that error appears in the above-identified patent and that said Letters Patent is hereby corrected as shown below:

On the title page:
Related U.S. Application Data, item (63), please replace "Continuation-in-part of application No. 11/180,143, filed on Jul. 13, 2005, now abandoned..." with --Continuation-in-part of application No. 11/180,143, filed on Jul. 13, 2005, now Pat. No. 7,020,383, ...--.

Column 1:
Line 8, please replace "This application is a continuation-in-part of U.S. application Ser. No. 11/180,143 filed on Jul. 13, 2005 now abandoned..." with --This application is a continuation-in-part of U.S. application Ser. No. 11/180,143 filed on Jul. 13, 2005 now U.S. Pat. No. 7,020,383, ...--.

Column 11:
Line 3, please remove "the area wherein" which follows the word "wherein".

Column 12:
Line 27, please remove the word "the" that follows "is mounted on".

Signed and Sealed this

Fifth Day of January, 2010

David J. Kappos
*Director of the United States Patent and Trademark Office*